United States Patent [19]

Kouda et al.

[11] Patent Number: 5,695,041
[45] Date of Patent: Dec. 9, 1997

[54] METHOD TO SEPARATE ARTICLES AND AN APPARATUS TO SUPPLY SEPARATED ARTICLES

[75] Inventors: Minoru Kouda, Hirakata; Hideki Itou, Machida, both of Japan

[73] Assignee: Matsushita Electric Industrial Co., Ltd., Osaka, Japan

[21] Appl. No.: 575,069

[22] Filed: Dec. 19, 1995

[30] Foreign Application Priority Data

Dec. 19, 1994 [JP] Japan ................ 6-314506

[51] Int. Cl.$^6$ ................ B65G 47/26
[52] U.S. Cl. ................ 198/459.2; 198/480.1
[58] Field of Search ................ 198/459.1, 459.2, 198/478.1, 479.1, 480.1

[56] References Cited

U.S. PATENT DOCUMENTS

| | | | |
|---|---|---|---|
| 1,941,152 | 12/1933 | Noll | 198/459.2 |
| 1,985,897 | 1/1935 | Huntar | 198/459.2 |
| 2,365,304 | 12/1944 | Stewart | 198/480.1 X |
| 2,638,202 | 5/1953 | Laster | 198/459.2 |
| 2,868,243 | 11/1959 | Henschen et al. | 198/459.2 X |
| 3,330,402 | 7/1967 | Schlueter | 198/459.2 X |
| 4,930,614 | 6/1990 | Kronseder | 198/480.1 X |
| 5,341,620 | 8/1994 | Katou et al. | 198/690.1 X |
| 5,509,524 | 4/1996 | Ohmori et al. | 198/690.1 X |

FOREIGN PATENT DOCUMENTS 3200625  9/1991  Japan .................. 198/495.2

*Primary Examiner*—James R. Bidwell
*Attorney, Agent, or Firm*—McDermott, Will & Emery

[57] ABSTRACT

A star index wheel with a plurality of semi-circular notches furnishes round or cylindrical articles to a supply index wheel of the automatic machine at an rate coinciding with the spacing of the semi-circular notches in the supply index wheel. The star index wheel is disposed on the side of a carrying conveyor on which the round or cylindrical articles are transported without any gaps between them. The star index wheel rotates at a speed whereby the semi-circular notches move at a speed slightly less than that of the linear speed of the carrying conveyor, so that the movement of the articles on the carrying conveyor is constrained by the protrusions provided between the semi-circular notches in the star index wheel. The rotational speed of the star index wheel also separates the articles to synchronize the rate at which they are supplied to the supply index wheel with the rotational speed of the supply index wheel.

7 Claims, 4 Drawing Sheets

METHOD TO SEPARATE ARTICLES AND AN APPARATUS TO SUPPLY SEPARATED ARTICLES

Field of the Invention

The present invention relates to a method and apparatus for separating and supplying round or cylindrical articles to or within automatic machinery. The invention separates round or cylindrical articles disposed continuously along a conveyor, creating equal distances between such articles for continuous supply to an index wheel of an automatic machine. The round or cylindrical articles are continuously fed into semi-circular notches disposed at equal distances around the index wheel.

BACKGROUND OF THE INVENTION

FIG. 4 illustrates a conventional method and apparatus for automatic continuous supply of round or cylindrical articles 1. The supply index wheel 6 pulls the round or cylindrical articles from a continuous supply off a conveyor belt or the like. The supply index wheel then feeds the round or cylindrical articles to index wheel 4-1 which contains semi-circular notches 7 disposed equi-distantly around the index wheel and in synchronization with the notches 11 in the supply index wheel. The supply index wheel thereby automatically supplies the index wheel 4-1 of an automatic machine with the round or cylindrical articles.

The method by which the round or cylindrical articles are inserted into supply index wheel 6 involved forcible insertion into the supply index wheel notches 11 at a predetermined interval through the momentum of the article traveling on the conveyor. The spacing of the notches in the supply index wheel creates gaps between the articles which coincide with the spacing of the notches 7 in the index wheel 4-1 of the automatic machine.

This method, however, creates a serious problem. The supply index wheel instantaneously arrests the velocity of an article, in the direction of the conveyor, upon its contact with the supply index wheel. The velocity of article is then increased very rapidly up to the rim speed of the supply index wheel when taken up by one of the wheel's notches. Therefore, this method subjects the article to an extreme velocity change potentially destroying or severely damaging the article. Additionally, the article may bounce back due to the reactive force from the supply index wheel, potentially causing problems such as the article hooking on the edge of the straight guide 5, binding on the notch 11 of the supply index wheel, or binding at the entrance of the guide.

A means for solving these problems, as illustrated in FIG. 5, employs an unevenly pitched lead screw 10 synchronized with the rotation of supply index wheel 4-4 which is synchronized further with the rotation of index wheel 4-1 of the automatic machine. Grooves 10-1 machined on the outer surface of the unevenly pitched lead screw creates a gap distance between articles which coincides with the gap distance of the semi-circular notches in the index wheel 4-1, and both the timing of supply and the transporting velocity are synchronized with the rotations of index wheel 4-1 and supply index wheel 4-4 respectively. Therefore, the articles proceed forward by the rotational movement of the grooves in the unevenly pitched lead screw and smoothly interface with the index wheel of the automatic machine. This method, however, also introduces various disadvantages. For instance, the machining of the unevenly grooved lead screw is costly, the shape of the article to be transported is restricted, and a fairly large space must be provided for the installation of this machine.

The present invention minimizes the potential for destruction of, or damage to, the articles being supplied to the automatic machine by employing a method and apparatus which eliminates any abrupt speed changes in the transition of the articles from the carrying conveyor to the supply index wheel.

SUMMARY OF THE INVENTION

The present invention overcomes the disadvantages of the prior art by providing a method and apparatus by which a star index wheel, with a plurality of semi-circular notches, supplies the round or cylindrical articles to the supply index wheel, at a rate coinciding with the spacing of the semi-circular notches in the supply index wheel. The star index wheel is disposed on the side of a carrying conveyor on which the round or cylindrical articles are transported without any gaps between them. The star index wheel rotates at a speed whereby the semi-circular notches move at a speed slightly less than that of the linear speed of the carrying conveyor, so that the movement of the articles on the carrying conveyor is constrained by the protrusions provided between the semi-circular notches in the star index wheel. The rotational speed of the star index wheel also separates the articles to synchronize the rate at which they are supplied to the supply index wheel with the rotational speed of the supply index wheel. The method and apparatus of the present invention eliminates any abrupt speed changes in the transition of the articles from the carrying conveyor to the supply index wheel which minimizes the potential for damage during the supply of the articles to the automatic machine.

DESCRIPTION OF THE PREFERRED EMBODIMENTS

Figure 1:
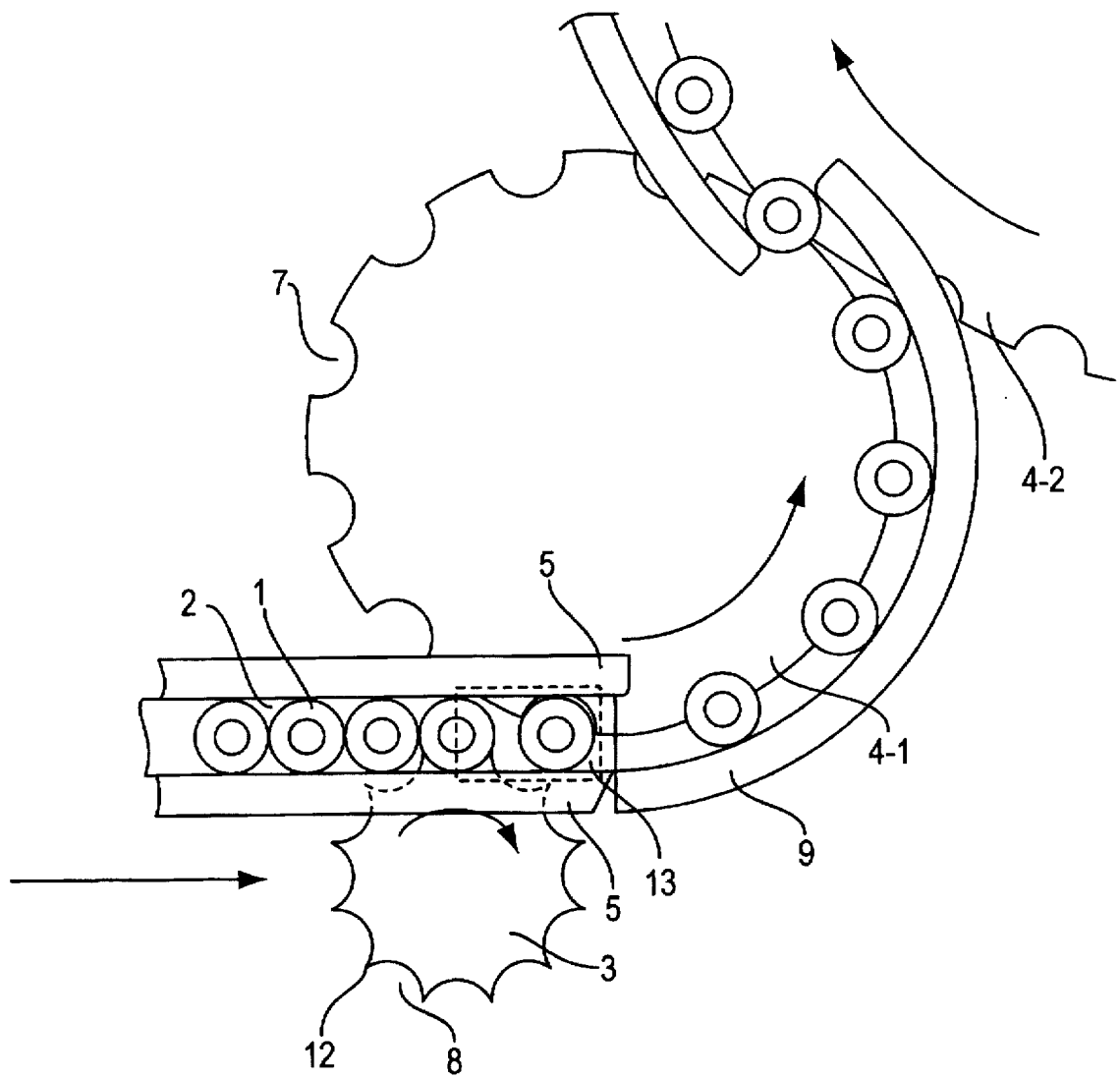
FIG. 1 shows a planar view of the present invention, illustrating the separation of the round or cylindrical articles, disposed continuously along the carrying conveyor, by the star index wheel.

In one embodiment of the present invention, as illustrated in FIG. 1, the carrying conveyor 2 transports the round or cylindrical articles 1 through the straight guides 5. The articles 1 move along the carrying conveyor 2 in a contiguous fashion, without any gaps between them. A star index wheel 3 disposed at a side of the carrying conveyor 2 separates the articles 1 and furnishes them to a supply index wheel 4-1. The supply index wheel 4-1 then furnishes the round or cylindrical articles 1 to the index wheel 4-2 of an automatic machine.

The star index wheel 3 contains a plurality of semi-circular notches 8 disposed around its outer edge. The star index wheel 3 rotates and the notches 8 grab the articles 1 between consecutive protrusions 12 and separate them to coincide with semi-circular notches 7 around the outer edge of the supply index wheel 4-1. The articles 1 are held within the notches 7 by the curved guide rail 9. The radii of the semi-circular notches 7 and 8 are nearly equivalent to the radius of the round or cylindrical article 1. The star index wheel 3 and the supply index wheel 4-1 of the automatic machine are disposed on the side of the of the carrying conveyor 2. In particular, the supply index wheel 4-1 of the automatic machine is disposed in a position where a circle connecting the center line of the carrying conveyor 2 and a circle connecting the center lines of the indentations housing the articles 2 are overlapped at a tangential condition.

The diameter of the star index wheel 3, in this embodiment, is about 100 mm, while the diameter of the supply index wheel 4-1 of the automatic machine is about twice that, so that the peripheral distance between notches 7 in the supply index wheel 4-1 is approximately twice that between notches 8 in star index wheel 3, and approximately twice the diameter of article 1.

The ratio of the rotational speed of the supply index wheel 4-1 to that of star index wheel 3 must be set such that the spacing of the articles 1 coincides with the spacing between notches 7 in the supply index wheel 4-1. The ratio of the rotational speed of the supply index wheel 4-1 to that of star index wheel 3, in this embodiment, is synchronized at a ratio of 1:1. Therefore, the rotational speed of the star index wheel 3 is set at approximately twice that of the index wheel 4-1 of the automatic machine.

Moreover, the linear rate of speed of the carrying conveyor 2 is set at a rate nearly equivalent to the peripheral speed of the supply index wheel 4-1, and at a rate slightly greater than the peripheral speed of the notches 8 in the star index wheel 3. The revolution of the star index wheel 3 being equivalent to the revolution of the supply index wheel 4-1, and the synchronized rotational ratio of 1:1 between the star index wheel 3 and the supply index wheel 4-1, synchronize the time required to cause a degree of peripheral displacement corresponding to one notch 8 and 7 on the star index wheel 3 and the supply index wheel 4-1 respectively and produce the difference in displacements of approximately one article as described above.

Articles 1 being transported contiguously by the carrying conveyor 2 are struck one-after-another by a protrusion 12 on star index wheel 3, and then trapped between two consecutive protrusions 12 while star index wheel 3 is positioned such that two consecutive protrusions 12 extend beyond the lower straight guide 5 of the carrying conveyor 2. While the article 1 is trapped within a notch 8 of star index wheel 3, that article 1 travels at the peripheral speed of the star index wheel 3. Then, as star index wheel 3 rotates further, and as the protrusion 12 trapping the right side of article 1 travels outside of the lower straight guide 5, article 1 is released and returns to the linear rate of speed of the carrying conveyor 2.

As described above, the speed of article 1 varies beginning with the linear rate of speed of the carrying conveyor 2, then attaining the peripheral speed of the star index wheel 3, and again returning to the linear rate of speed of the carrying conveyor 2 which is equivalent to the peripheral speed of the supply index wheel 4-1 of the automatic machine.

Figure 2:
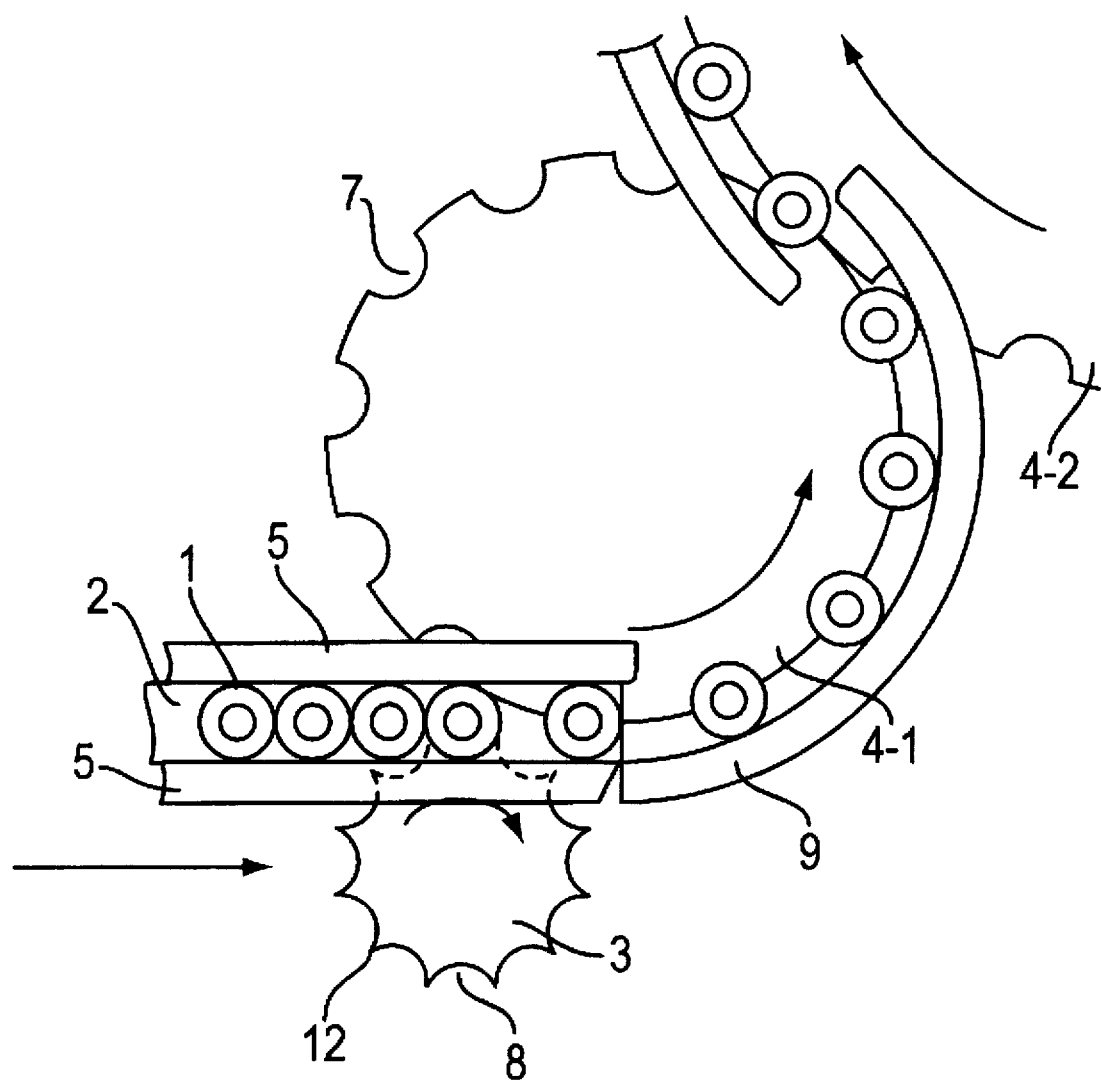
FIG. 2 shows a planar view of the present invention, illustrating the supply of the separated articles to the supply index wheel which in turn furnishes such articles to the index wheel of the automatic machine.

Within this series of movements of article 1, between the time article 1 is first trapped within a notch 8 of star index wheel 3 and the time just after article 1 is released by star index wheel 3, a gap distance between the article 1 just released by the star index wheel 3 and the next article 1 is created to coincide with the spacing between the notches 7 in the supply index wheel 4-1 of the automatic machine. This gap is set according to the difference in the displacement caused by the difference in speed of the first article 1 traveling at the linear rate of speed of the carrying conveyor, and that of the next article 1 trapped in a notch 8 and traveling at the peripheral speed of the star index wheel 3. FIGS. 1 and 2 illustrate the sequential positioning of article 1 while it is being released from the star index wheel 3 and immediately after it is released from star index wheel 3 and returns to the linear rate of speed of the carrying conveyor 2, respectively.

Moreover, since the rotational displacement of notch 8 in star index wheel 3 coincides with the rotational displacement of notch 7 in supply index wheel 4-1, article 1 can be inserted smoothly into notch 7 of supply index wheel 4-1 of the automatic machine. Additionally, in this embodiment of the invention, the disposition distance between the notches 7 of supply index wheel 4-1 corresponding to a distance of approximately twice the diameter of an article 1, and coinciding with the gap distance created by star index wheel 3, further assure the smooth insertion of article 1 into notch 7 of the supply index wheel 4-1 of the automatic machine.

The setting of the disposition distances between the notches 8 and 7 of the star index wheel 3 and supply index wheel 4-1, respectively, can be predetermined if the carrying conveyor 2 is maintained at a specific linear rate of speed. For example, where the articles 1 are held by permanent magnets enabling the input of articles 1 into the supply index wheel 4-1 while maintaining the widened gap distance obtained after an article 1 is released from the notch 8 in the star index wheel 3. An example of a permanent magnet is depicted in FIG. 1 and identified by the numeral 13.

In a variation of the present invention, provided that the ratio of the rotational displacement of the notches 7 in the supply index wheel 4-1 to that of the notches 8 in the star index wheel 3 is set at a ratio of 1:1, the numbers of respectively disposed notches 7 and 8 can be determined arbitrarily. For example, it is possible to directly input articles 1 from a star index wheel 3, with a smaller number of notches 8, into a supply index wheel 4-1, with a larger number of notches 7. In another variation of the present invention, the supply index wheel 4-1 rotates intermittently.

Figure 3:
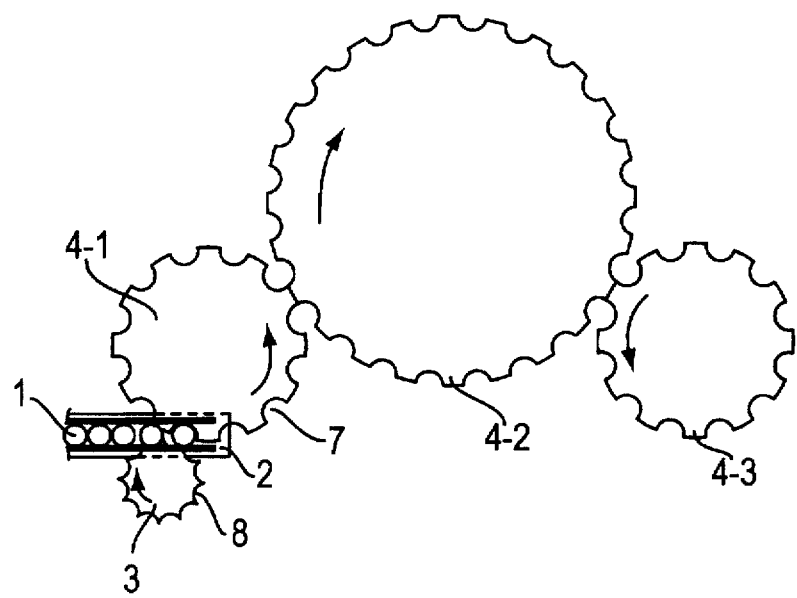
FIG. 3 shows a planar view of an embodiment of the automatic machine of the present invention.
Figure 4:
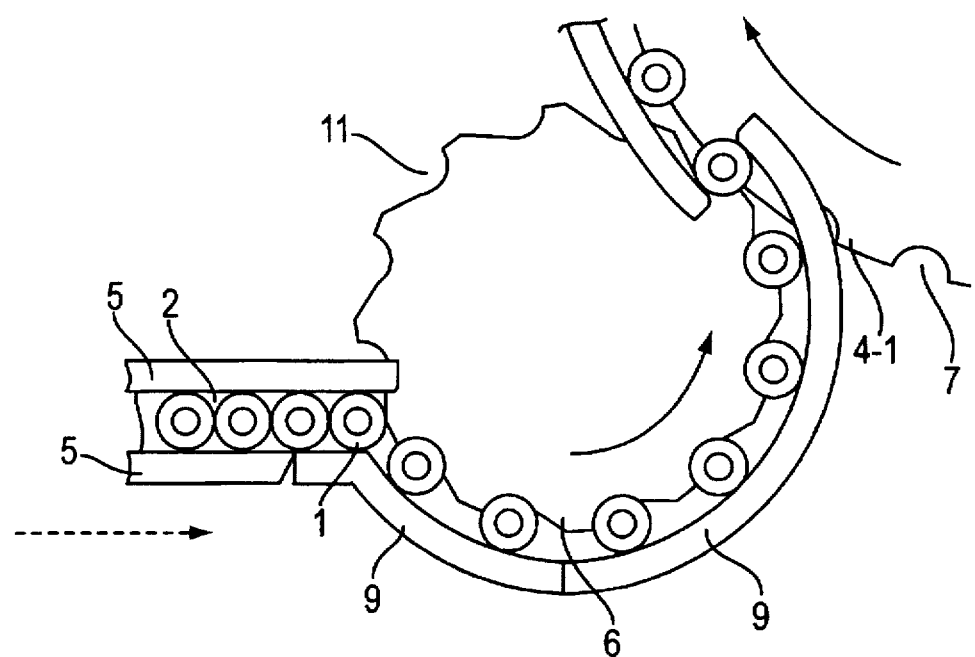
FIG. 4 shows a planar view of a conventional separation and supply apparatus lacking any method or apparatus for separation of the articles prior to supplying them to the supply index wheel.
Figure 5:
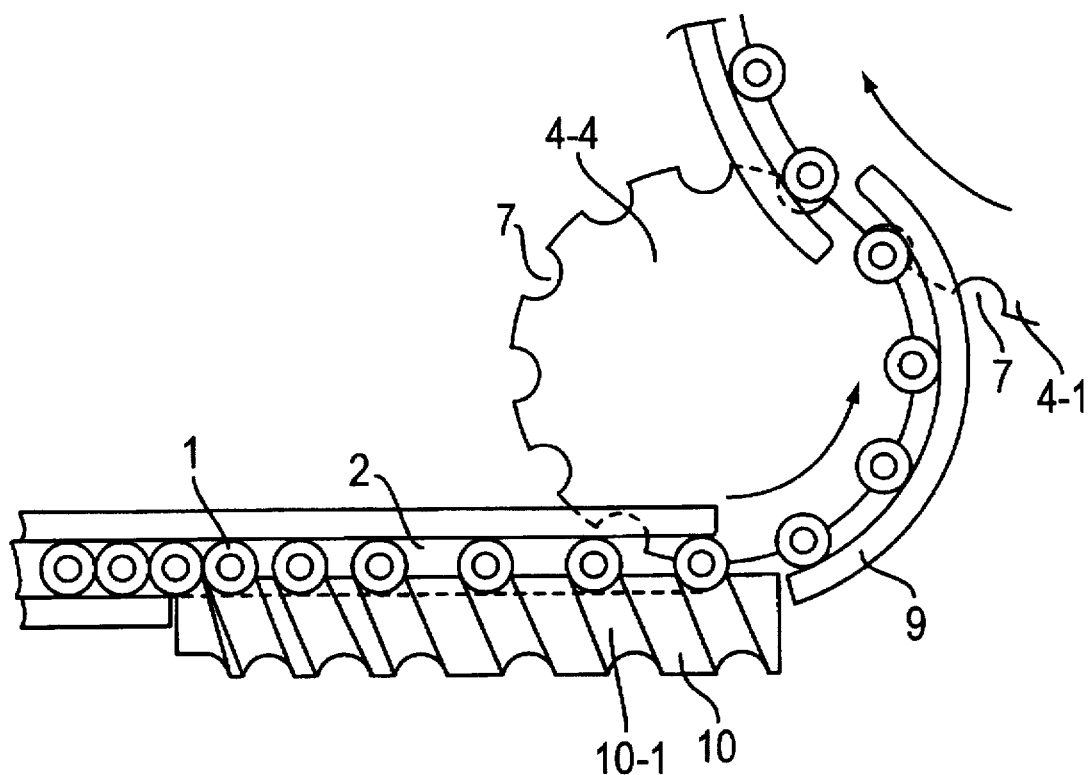
FIG. 5 shows a planar view of a conventional separation and supply apparatus utilizing an unevenly grooved lead screw for separation of the articles prior to supplying them to the supply index wheel.

FIG. 3 shows a planar layout of an automatic machine in accordance with the present invention comprising a star index wheel 3 and a supply index wheel 4-1 of an automatic machine, combined with a second index wheel 4-2 and an outlet index wheel 4-3.

What is claimed is:

1. An apparatus for separating round or cylindrical articles and for supplying said articles to an automatic machine, said apparatus comprising:

a carrying conveyor for transporting said articles at a specific linear rate of speed,
   wherein said carrying conveyor has a pair of straight guides provided in parallel to each other and separated by a distance substantially equal to a diameter of said articles,
   wherein said pair of straight guides have a center line located equidistant between each straight guide, and
   wherein said carrying conveyor transports said articles in a continuous manner without a gap between said pair of guides and said articles;

a star index wheel disposed at a side of said carrying conveyor for separating said articles at a specific separating rate, wherein said star index wheel has a plurality of semi-circular notches disposed around its outer edge of said star index wheel for engaging and separating said articles between consecutive protrusions, and wherein said star index wheel revolves at a specific rotational speed; and a supply index wheel for receiving said articles from said star index wheel for supplying said articles to an automatic machine, wherein said supply index wheel has a plurality of semi-circular notches disposed around a outer edge of the supply index wheel, and wherein said supply index wheel revolves at a specific rotational speed coinciding with said specific separating rate of said star index wheel, and a curved guide rail provided around the periphery of said supply index wheel, and wherein each semi-circular notches of said star index wheel has a center that moves along said center line in a tangential manner during a revolution of said star index wheel, and wherein each semi-circular notches of said supply index wheel has a center that moves along said center line in a tangential manner during a revolution of said supply index wheel.

2. The apparatus according to claim 1, wherein a radius of each semi-circular notch of said star index wheel and a radius of each semi-circular notch of said star index wheel are nearly equivalent to the radius of said articles.

3. The apparatus according to claim 1, wherein a linear rate of speed of said carrying conveyor is set at a rate equivalent to a peripheral speed of said supply index wheel, and wherein a peripheral speed of said star index wheel is set at a rate slightly slower than said linear rate of speed and said peripheral speed of said supply index wheel.

4. The apparatus according to claim 1, wherein a diameter of said supply index wheel is about twice a diameter of said star index wheel, and wherein a rotational speed of said star index wheel is set at nearly twice a rotational speed of said supply index wheel.

5. The apparatus according to claim 1, wherein a ratio of the rotational speed of said star index wheel and a ratio of the rotational speed of said supply index wheel is set to about a ratio of 1:1.

6. The apparatus according to claim 1, wherein said supply index wheel revolves intermittently or continuously at a specific rotational speed.

7. An apparatus for separating round or cylindrical articles and for supplying said articles to an automatic machine, said apparatus comprising:

a carrying conveyor for transporting said articles at a specific linear rate of speed, wherein said carrying conveyor has a pair of straight guides provided in parallel to each other and separated by a distance substantially equal to a diameter of said articles, wherein said pair of straight guides have a center line located equidistant between each straight guide, wherein said carrying conveyor has a permanent magnet for holding said articles, and wherein said carrying conveyor transports said articles in a contiguous manner without a gap between said pair of guides and said articles;

a star index wheel disposed at a side of said carrying conveyor for supplying said articles at a specific supply rate to a supply index wheel, wherein said star index wheel has a plurality of semi-circular notches disposed around its outer edge of said star index wheel for engaging and separating said articles between consecutive protrusions, and wherein said star index wheel revolves at a specific rotational speed; and a supply index wheel for receiving said articles from said star index wheel for supplying said articles to an automatic machine, wherein said supply index wheel has a plurality of semi-circular notches disposed around a outer edge of the supply index wheel, wherein said supply index wheel revolves at a specific rotational speed coinciding with said specific supply rate of said star index wheel, and wherein each semi-circular notch has a center that moves along said center line in a tangential manner during each revolution of a wheel,.

* * * * *